United States Patent [19]

Iwata et al.

[11] Patent Number: 5,692,991
[45] Date of Patent: Dec. 2, 1997

[54] AUTOMATIC TRANSMISSION CONTROL APPARATUS

[75] Inventors: Akihito Iwata; Yoshihisa Yamamoto; Kazumasa Tsukamoto; Masahiro Hayabuchi, all of Aichi-ken, Japan

[73] Assignee: Aisin Aw Co., Ltd., Aichi-ken, Japan

[21] Appl. No.: 646,466

[22] Filed: May 8, 1996

[30] Foreign Application Priority Data

May 12, 1995 [JP] Japan ................... 7-138375

[51] Int. Cl.$^6$ ................................ F16H 61/06
[52] U.S. Cl. ................................ 477/98
[58] Field of Search ................... 477/98, 117

[56] References Cited

U.S. PATENT DOCUMENTS

| | | |
|---|---|---|
| 4,718,525 | 1/1988 | Yamaguchi . |
| 4,982,622 | 1/1991 | Yamamoto et al. ........ 477/98 |
| 5,024,125 | 6/1991 | Baba ........................ 477/98 |
| 5,115,694 | 5/1992 | Sasaki et al. .............. 477/98 |
| 5,182,970 | 2/1993 | Goto et al. ................ 477/98 |
| 5,301,572 | 4/1994 | Tanaka et al. . |
| 5,303,613 | 4/1994 | Kitagawa et al. .......... 477/98 |
| 5,385,511 | 1/1995 | Iizuka . |

FOREIGN PATENT DOCUMENTS

| | | |
|---|---|---|
| 0 588 443 A1 | 3/1994 | European Pat. Off. . |
| 38 12 672 A1 | 11/1988 | Germany . |
| 38 27 152 A1 | 2/1989 | Germany . |
| 42 25 189 A1 | 2/1993 | Germany . |
| A-3-28571 | 2/1991 | Japan . |

Primary Examiner—Dirk Wright
Attorney, Agent, or Firm—Oliff & Berridge

[57] ABSTRACT

An automatic transmission control apparatus has an input clutch, a hydraulic servo for the clutch, a fluid temperature detector, an engine start detector, a range shift detector, and a control device for controlling the fluid pressure supply to the hydraulic servo. The control device raises the fluid pressure supply to the hydraulic servo on the basis of predetermined rising characteristics in normal operation. When it is determined that the shift has been performed for the first time since the start of the engine and it is determined that the fluid temperature is lower than a predetermined temperature, the control device rapidly raises the fluid pressure supply to the hydraulic servo up to the required engaging pressure.

2 Claims, 9 Drawing Sheets

FIG. 3

| | | Clutch | | | Brake | | | | One-Way Clutch | | |
|---|---|---|---|---|---|---|---|---|---|---|---|
| | | C1 | C2 | C3 | B1 | B2 | B3 | B4 | F1 | F2 | F3 |
| R | | × | ○ | × | × | × | ○ | ○ | × | × | × |
| N | | × | × | × | × | × | × | ○ | × | × | × |
| D | 1ST | ○ | × | × | × | × | (○) | ○ | × | ○ | ○ |
| | 2ND | ○ | × | × | ○ | ○ | × | ○ | ○ | × | ○ |
| | 3RD | ○ | × | ○ | ○ | ○ | × | × | ○ | × | × |
| | 4TH | ○ | ○ | ○ | × | ○ | × | × | × | × | × |

AUTOMATIC TRANSMISSION CONTROL APPARATUS

BACKGROUND OF THE INVENTION

1. Field of the Invention

The invention relates to an automatic transmission control apparatus and, more particularly, to a control apparatus for controlling engagement of a clutch for transmitting rotation from an engine to a speed changing apparatus.

2. Description of the Related Art

A typical automatic transmission employs a clutch for transmitting rotation from an engine to a speed changing apparatus. Such a clutch is operated to engage by shifting the automatic transmission from a non-driving range (the neutral (N) range) to a forward driving range (the drive range). Since this engaging operation must be quickly performed without producing a shock, the technology disclosed in Japanese patent application laying-open No. HEI 3-28571 is conventionally used. As shown in FIG. 9, this technology temporarily rapidly raises the fluid pressure supply to the hydraulic servo for engaging the clutch to a high fluid pressure (shelf pressure) and maintains the high fluid pressure for a period from the N-to-D shift until the clutch starts to engage, that is, during the piston stroke of the hydraulic servo, in order to quickly complete the piston stroke, that is, to shorten the time taken until the engagement starts, and then rapidly lowers the fluid pressure to a low fluid pressure level before an initial period of the engagement, and gradually raises the fluid pressure in accordance with predetermined characteristics as the engagement progresses, in order to reduce the engaging shocks. In this technology, the fluid pressure supply to the hydraulic servo is regulated by a pressure regulating valve on the basis of a signal pressure from a solenoid valve during the entire supply period. Thus, the conventional technology shortens the engaging time while reducing the engaging shocks.

When a vehicle has been left still for a long time (for example, overnight), most of the lubricating oil in the automatic transmission has returned to the reservoir, leaving very thin oil films on various parts inside the speed changing mechanism. With very thin oil films, the hydraulic servo suffers a high sliding resistance on the piston, requiring an increased fluid pressure for the piston stroke, compared with a case where normal oil films are provided, for example, when the vehicle has not been left still for a long time. In the undesired state mentioned above, force from fluid pressure is consumed for the piston stroke, and a high fluid pressure is required until the piston stroke ends. More specifically, if the temperature of the lubricating oil, that is, the temperature of the various parts of the speed changing mechanism, is high (that is, normal temperature or higher), a rubber O-ring fitted on the piston for sealing the gap between the piston and the cylinder tightly against fluid pressure is soft so that the sliding resistance remains relatively low despite the thin oil films. However, if the fluid temperature is low, the rubber O-ring becomes hard so that a high fluid pressure will be required for operation. Thus, low fluid temperature impedes rapid piston stroke of the hydraulic servo.

In addition, low fluid temperature causes an increase of the viscosity resistance of the operating fluid, which delays the fluid pressure rise in the hydraulic servo in response to the control of raising the fluid pressure supply in accordance with predetermined characteristics. Therefore, when the oil films are thin and the fluid temperature is low, the fluid pressure raising control with predetermined pressure supply characteristics according to the conventional art fails to raise the fluid pressure in the hydraulic servo (referred to as "HYDRAULIC SERVO PRESSURE" in FIG. 9) in an expected manner as indicated by a solid line. Instead, as indicated by a broken line, the high sliding resistance causes a piston stroke uncompleted state to continue even in the engaging pressure control region. Furthermore, even after the piston stroke ends, the high viscosity resistance delays the servo pressure rise relative to the control characteristics. Thus, the clutch engagement is considerably delayed.

SUMMARY OF THE INVENTION

Accordingly, it is a first object of the invention to prevent the input clutch engaging time and engaging shocks when the engine is just started at a low fluid temperature, while performing smooth clutch engagement in a normal operation as in the conventional art, by performing the N-to-D shift control of an automatic transmission in accordance with different control characteristics of the fluid pressure supply to the hydraulic servo selected for the normal operation and for operation when the engine is just started at a low temperature.

A second object of the invention is to simply and reliably change the fluid pressure characteristics while avoiding use of complicated pressure regulating means, by switching a changeover valve.

According to the invention, there is provided an automatic transmission control apparatus comprising a clutch which, when a forward driving range is selected, is engaged to transmit rotation from an engine to a speed changing apparatus; a hydraulic servo for selectively engaging and releasing the clutch; fluid temperature detecting means for detecting fluid temperature; engine start detecting means for detecting start of the engine; range shift detecting means for detecting shift to the forward driving range; and control means for controlling fluid pressure supply to the hydraulic servo on the basis of a signal from the fluid temperature detecting means, a signal from the range shift detecting means, and a signal from the engine start detecting means. The control means comprises first determining means for, when shift to the forward driving range is performed, determining whether the shift to the forward driving range has been performed for the first time since start of the engine; second determining means for determining whether a detected fluid temperature is lower than a predetermined fluid temperature on the basis of the signal from the fluid temperature detecting means; and fluid pressure raising means for rapidly raising the fluid pressure supply to the hydraulic servo up to a required engaging pressure for the clutch when the first determining means determines that the shift to the forward driving range has been performed for the first time since the start of the engine and the second determining means determines that the detected fluid temperature is lower than the predetermined fluid temperature, the fluid pressure raising means gradually raising the fluid pressure supply to the hydraulic servo up to the required engaging pressure for the clutch on the basis of a predetermined rising characteristic when at least one of the first determining means and the second determining means makes a negative determination.

Preferably, the control means further comprises fluid pressure control means and electronic control means. The fluid pressure control means comprises a manual valve for outputting a forward driving range pressure when the forward driving range is selected; pressure regulating means for regulating the forward driving range pressure on the basis of a signal from the electronic control means to output a regulated fluid pressure; and changeover means able to be selectively changed over between a first position for supplying the forward driving range pressure to the hydraulic servo and a second position for supplying the regulated fluid pressure to the hydraulic servo on the basis of a signal from the electronic control means. The electronic control means comprises the first determining means, the second determining means and the fluid pressure raising means. When the first determining means determines that the shift to the driving range means has been performed for the first time since the start of the engine and the second determining means determines that the detected fluid temperature is lower than the predetermined fluid temperature, the fluid pressure raising means outputs a signal to the changeover means to hold the changeover means in the first position at least for a period lasting until the engagement of the clutch is completed. When at least one of the first determining means and the second determining means makes a negative determination, the fluid pressure raising means outputs a signal to the changeover means to shift the changeover means to the second position, and outputs a signal to the pressure regulating means to cause the pressure regulating means to gradually raise the fluid pressure from an initial fluid pressure.

With the above-described structure of the invention, although the oil film on the sliding portions of the hydraulic servo is very thin and the piston sliding resistance is great when the fluid temperature is low and the shift to the forward driving range is performed for the first time after the engine has been started, a rapidly increased fluid pressure is supplied to the hydraulic servo on such an occasion so that the high fluid pressure will overcome the great sliding resistance to complete the piston stroke as quickly as possible. After the piston stroke ends, the fluid pressure in the hydraulic servo rises relatively bluntly, not sharply, because of the viscosity resistance of the fluid, thus preventing abrupt engagement. In contrast, when the shift to the forward driving range is performed for the second or later time after the engine has been started, the low fluid temperature and the great sliding pressure have already been removed, and sufficiently thick oil films have been formed on the sliding portion of the piston. Thus, the fluid pressure supply is gradually raised on the basis of the predetermined raising characteristics to achieve smooth engagement as desired. As described above, the control apparatus of the invention reduces the engaging time without producing engaging shocks even when the fluid pressure is low and the N-to-D shift is performed for the first time after the engine has been started.

The preferable structure described above changes the engaging characteristics by switching the changeover valve to avoid a delay in the fluid pressure characteristics following the control, as can be avoided by using specific pressure regulating means to change the engaging characteristics. Thus, this structure easily and reliably performs control in an expected manner

BRIEF DESCRIPTION OF THE DRAWINGS

The foregoing and further objects, features and advantages of the invention will become apparent from the following description of a preferred embodiment with reference to the accompanying drawings, wherein:

FIG. 2 is a schematic block diagram of the structure of an automatic transmission according to the embodiment, illustrating the mechanical portions in;

FIG. 3 is a table showing various operations of the automatic transmission;

DETAILED DESCRIPTION OF PREFERRED EMBODIMENT

A preferred embodiment of the invention will be described hereinafter with reference to the accompanying drawings.

Figure 1:
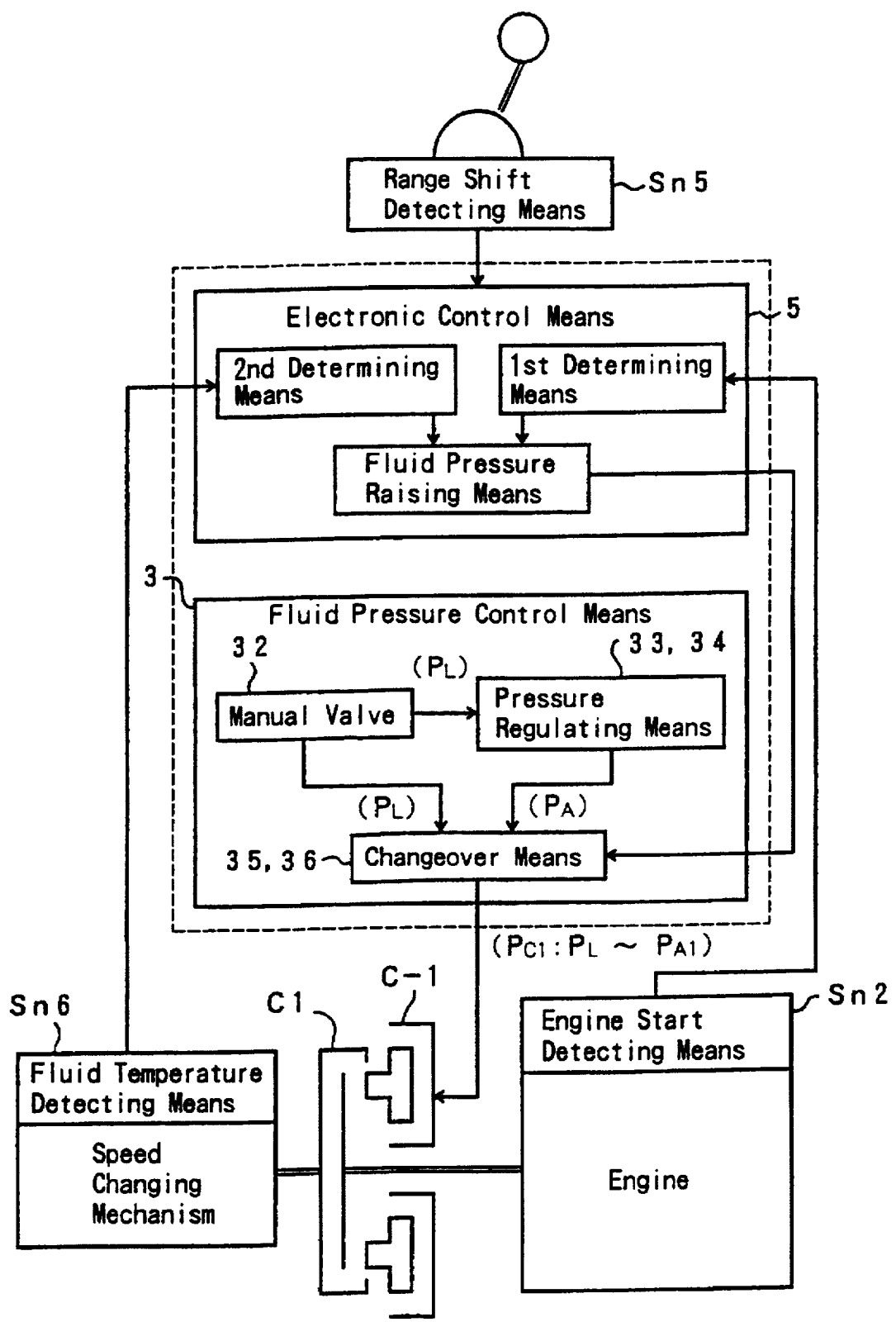
FIG. 1 is a schematic block diagram of an embodiment of the invention.

Referring to FIG. 1, an automatic transmission control apparatus according to the embodiment comprises an input clutch C1 which, when a forward driving range is selected, is engaged to transmit rotation from an engine to a speed changing apparatus; a hydraulic servo C-1 for selectively engaging and releasing the input clutch C1; fluid temperature detecting means Sn6 for detecting fluid temperature; engine start detecting means Sn2 for detecting start of the engine; range shift detecting means Sn5 for detecting shift to the forward driving range; and control means 3, 5 for controlling fluid pressure to be supplied to the hydraulic servo C-1, on the basis of a signal from the fluid temperature detecting means Sn6, the engine start detecting means Sn2 and the range shift detecting means Sn5.

The control means 3, 5 comprises first determining means for, when shift to the forward driving range is performed, determining whether the shift to the forward driving range has been performed for the first time since start of the engine; second determining means for determining whether a detected fluid temperature is lower than a predetermined fluid temperature on the basis of the signal from the fluid temperature detecting means Sn6; and fluid pressure raising means for rapidly raising the fluid pressure supply to the hydraulic servo C-1 up to a required engaging pressure for the clutch C1 when the first and second determining means determine that the shift to the forward driving range has been performed for the first time since the start of the engine, and that the detected fluid temperature is lower than the predetermined fluid temperature, and for gradually raising the fluid pressure supply to the hydraulic servo C-1 up to the required engaging pressure for the clutch C1 on the basis of a predetermined rising characteristic when at least one of the determining means makes a negative determination.

The control means 3, 5 further comprises fluid pressure control means 3 and electronic control means 5. The fluid pressure control means 3 comprises a manual valve 32 for outputting a forward driving range pressure when the forward driving range is selected; pressure regulating means 33, 34 for regulating the forward driving range pressure ($P_L$) on the basis of a signal from the electronic control means 5 to output a regulated fluid pressure; and change over means 35, 36 able to be selectively changed over between a first position for supplying the forward driving range pressure ($P_L$) to the hydraulic servo C-1 and a second position for supplying the regulated fluid pressure ($P_A$) to the hydraulic servo C-1 on the basis of a signal from the electronic control means 5.

The electronic control means 5 comprises the first determining means, the second determining means and the fluid pressure raising means. When the first and second determining means determine that the shift to the driving range has been performed for the first time since the start of the engine and that the detected fluid temperature is lower than the predetermined fluid temperature, the fluid pressure raising means outputs a signal to the changeover means 35, 36 to hold the changeover means 35, 36 in the first position at least for a period lasting until the engagement of the clutch C1 is completed. When at least one of the determining means makes a negative determination, the fluid pressure raising means outputs a signal to the changeover means 35, 36 to shift the changeover means 35, 36 to the second position, and outputs a signal to the pressure regulating means 33, 34 to cause the pressure regulating means 33, 34 to gradually raise the fluid pressure from an initial fluid pressure.

Figure 2:
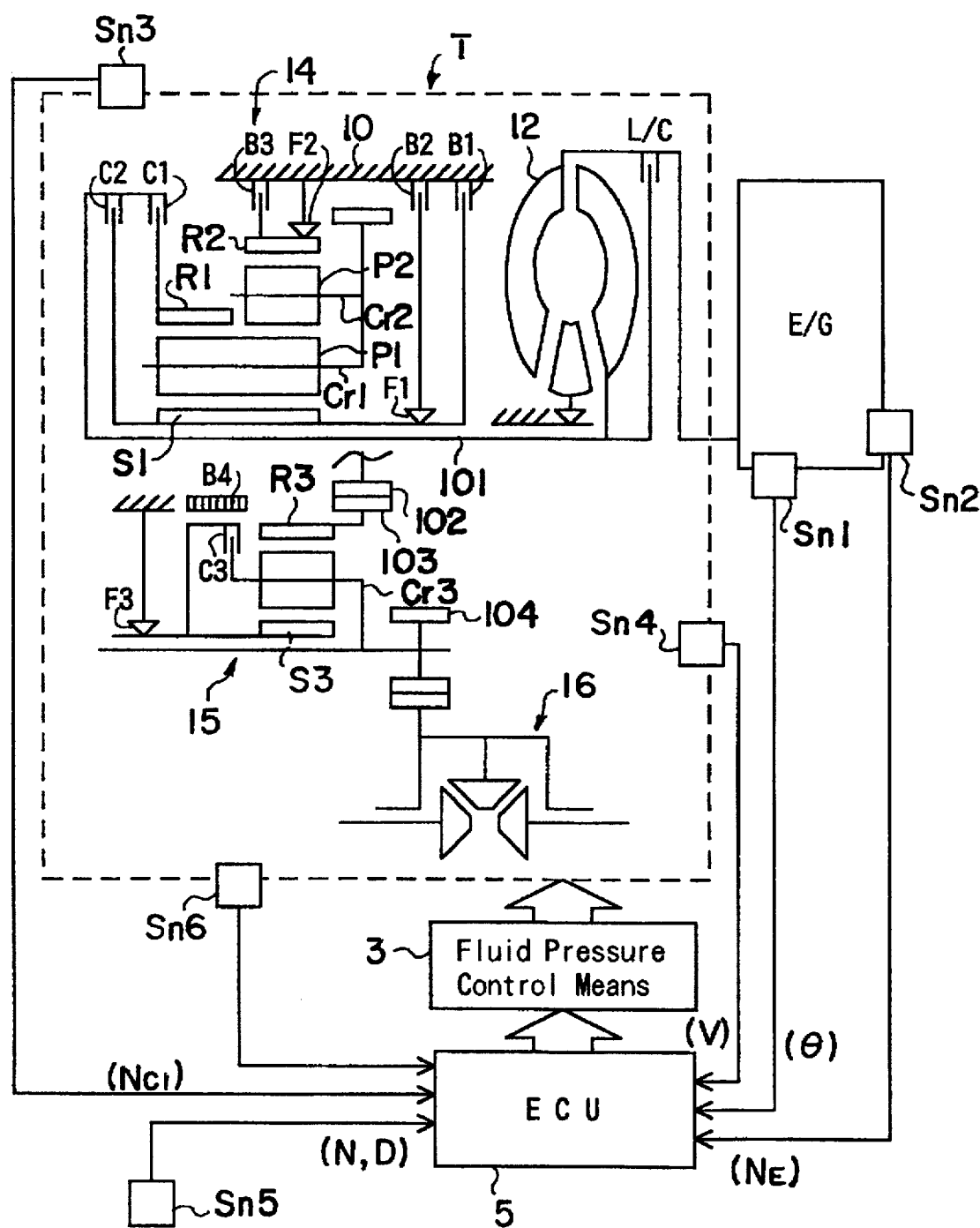

Various components will be described in detail. As illustrated in FIG. 2, the automatic transmission T according to this embodiment has a gear train of four forward speeds and one reverse speed for a front-engine front wheel drive vehicle. The automatic transmission T comprises a torque converter 12 having a lockup clutch denoted by an abbreviation L/C in the drawing; a biaxial gear train having a main speed changing unit 14 and an under drive-type planetary gear unit 15; a differential unit 16; a fluid pressure control unit 3 provided as the fluid pressure control means for controlling the gear train and the lockup clutch L/C; and an electronic control unit (indicated by an abbreviation ECU in the drawing) 5 provided as the electronic control means for controlling the fluid pressure control unit 3.

FIG. 2 further shows an engine E/G, a throttle sensor Sn1 for detecting throttle opening (θ) of the engine E/G; an engine speed sensor Sn2 for detecting engine speed ($N_E$); a clutch C1 rotational speed sensor Sn3 for detecting rotational speed ($N_{C1}$) of the clutch C1 provided as the first friction engaging means of the automatic transmission T; a vehicle speed sensor Sn4 for detecting a vehicle speed (V) based on output speed; a neutral start switch sensor Sn5 provided as range shift detecting means for detecting a shift position; and a fluid temperature sensor Sn6 for detecting the temperature of the operating fluid in the automatic transmission T. The electronic control unit 5 is a control computer that outputs control signals to the on-off solenoid valve 36 and linear solenoid valve 34 (FIG. 4) of the fluid pressure control unit 3 on the basis of information from the various sensors, mainly in accordance with the throttle opening (θ) and the vehicle speed (V), following the installed program.

The main speed changing unit 14 of the gear train of the automatic transmission T comprises a single pinion-type planetary gear unit and a double pinion-type planetary gear unit. The two gear units are combined by using an integrated sun gear S1 and integrating with one set of pinion gears P1 of the double pinion-type gear unit with the planetary gears of the single pinion-type gear unit, and by connecting a carrier Cr1 supporting the pinion gears P1 and a carrier Cr2 supporting the other set of pinion gears P2 of the double pinion-type gear unit. The sun gear S1 common to the two gear units of the main speed changing unit 14 is fixable to a transmission casing 10 by a brake B1 and is also fixable to the casing 10 by a one-way clutch F1 and a brake B2 that are disposed in series. A ring gear R1, of the single pinion-type gear unit, is connected to an input shaft 101 by the clutch C1 according to the invention. The sun gear S1 is connected to the input shaft 101 by a clutch C2. The input shaft 101 is connected to a turbine output shaft of the torque converter 12. The carrier Cr1, supporting the pinion gears P1 meshed with the sun gear S1, the ring gear R1 and the pinion gears P2, and the carrier Cr2, supporting the pinion gears P2 meshed with the pinion gears P1 and a ring gear R2, are connected by a counter gear 102. The ring gear R2 of the double pinion-type gear unit is fixable to the transmission casing 10 by a brake B3 and a one-way clutch F2 that are disposed in parallel.

A ring gear R3 of the under drive planetary gear unit 15 is an input element connected to the main speed changing unit 14 by the counter gears 102, 103. A carrier Cr3 and a sun gear S3 are connected by a clutch C3. The sun gear C3 is fixable to the transmission casing 10 by a one-way clutch F3 and a band brake B4 that are disposed in parallel. The carrier Cr3 is connected to an output gear 104 for transmission to the differential unit 16.

In the gear train structured as described above, under an under when in drive rotational state where the sun gear S3 of the under drive planetary gear unit 15 is fixed with the clutch C3 released and the brake B4 engaged, so as to achieve input to the ring gear R3 and output from the carrier Cr3, the first speed is achieved when the input transmitted to the ring gear R1 by engagement of the input clutch C1 of the main speed changing unit 14 is outputted as rotation of the carriers Cr1, Cr2 by reaction force support of the ring gear R2 provided by engagement of the one-way clutch F2. The second speed is achieved when the input to the ring gear R1 is outputted as rotation of the carriers Cr1, Cr2 while the sun gear S1 is fixed by engagement of the brake B2. The third speed is achieved when the main speed changing unit 14 is in the direct-coupled state where the clutch C2 is additionally engaged to rotate the ring gear R1 and the sun gear S1 at the same speed, so that the input rotation is directly output from the carriers Cr1, Cr2. In a direct-coupled state of the under drive planetary gear unit 15 achieved by release of the brake B4 and engagement of the clutch C3, the fourth speed is achieved. The reverse is achieved when the clutch C2 is engaged and the brake B3 is engaged to achieve input to the sun gear S1 and fixation of the ring gear R2 so that rotation of the carrier Cr2 reverses.

FIG. 3 shows a table showing the relationship between the operation of the clutches, the brakes and the one-way clutches and the thereby-achieved gear speeds, that is, the first speed to the fourth speed. In the table, "R" indicates the reverse drive position; "N" indicates the neutral position; "D" indicates the forward drive shift positions; "O" indicates engagement; "X" indicates release; and (O) indicates engagement effected only during engine braking.

Figure 4:
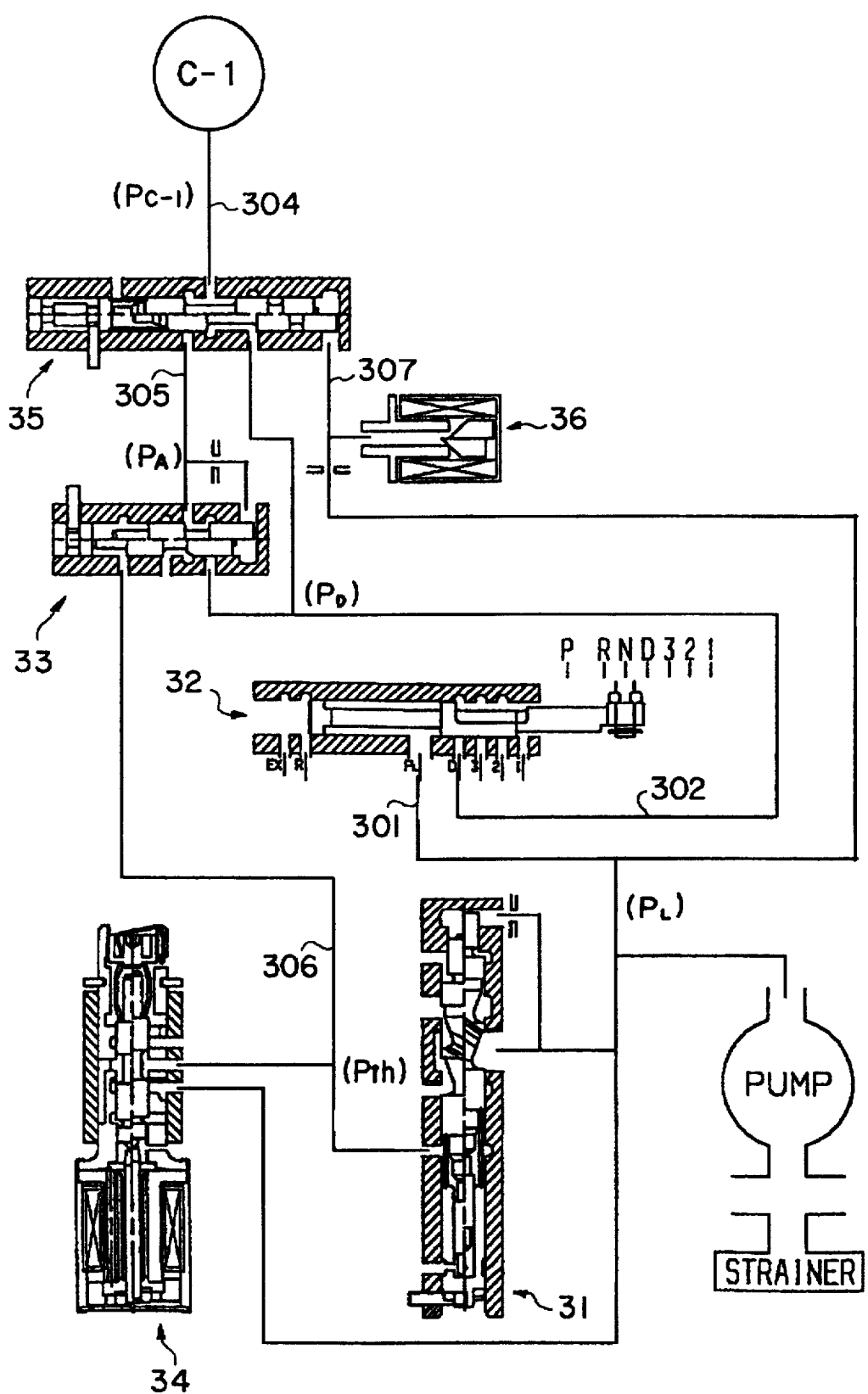
FIG. 4 is a partial circuit diagram of a fluid pressure control unit of the automatic transmission.

Referring to FIG. 4, the hydraulic circuit for controlling the gear train as described above comprises, similar to the hydraulic circuit of a conventional fluid pressure control apparatus, an oil pump (PUMP) as a fluid pressure source incorporated in the speed changing mechanism, various pressure regulating valves that include a primary regulator valve 31 for regulating the pressure from the oil pump to a predetermined stable line pressure ($P_L$) in accordance with the vehicle speed and the throttle opening to output a secondary pressure and a secondary regulator valve (not shown) for reducing the secondary pressure to a regulated torque converter pressure supply and outputting the remaining pressure as a lubrication pressure, the manual valve 32, various solenoid valves that include the solenoid valve 36 and a linear solenoid valve 34, various shift valves, orifices and check valves disposed in the passages connecting the various valves.

FIG. 4 is illustrates only portions of the above-described hydraulic circuit that are relevant to the present invention. This circuit comprises the manual valve 32, a C-1 control valve 33 and the linear solenoid valve 34 for controlling the C-1 control valve 33, and a C-1 changeover valve 35 and the solenoid valve 36 for controlling the C-1 changeover valve 35. The manual valve 32 is connected at its input port to a line pressure fluid passage 301 and at its output port to a D range pressure fluid passage 302 so as to output a D range pressure, that is, a line pressure ($P_L$) in accordance with current throttle opening ($\theta$) shown as pressure $P_D$ in FIG. 4, when the forward driving range, that is, the D range, is selected.

The C-1 control valve 33 is a secondary pressure-operated pressure reducing valve that receives at the opposite ends of the spool the throttle signal pressure (Pth) and the feedback pressure of the regulated fluid pressure ($P_A$) to the clutch C1 to adjust the openings of the output, input and signal ports. The inputport is connected to the D range pressure fluid passage 302. The output port is connected to a regulated fluid pressure output fluid passage 305. The signal port is connected to a throttle signal pressure fluid passage 306. The feedback port is connected to the regulated fluid pressure output fluid passage 305 through an orifice. The linear solenoid valve 34 outputs the throttle signal pressure (Pth) provided by reducing the line pressure ($P_L$) as the basic pressure, on the basis of the signal from the electronic control unit 5. The throttle signal pressure (Pth) is supplied to the primary regulator valve 31 and the C-1 control valve 33 through the throttle signal pressure fluid passage 306. Thus, the C-1 control valve 33 and the linear solenoid valve 34 perform the function of the pressure regulating means for regulating the line pressure ($P_L$) on the basis of the signal from the electronic control unit 5 and for outputting the regulated fluid pressure ($P_A$).

The C-1 changeover valve 35 is a spool-type changeover valve that selectively communicates the output port with the input port connecting to the regulated fluid pressure output fluid passage 305 or the input port connecting to the D range pressure fluid passage 302. The C-1 changeover valve 35 is switched by a solenoid signal pressure opposing the spring force acting on an end of the spool. The solenoid valve 36 is a normal open-type on-off valve that closes upon receiving the solenoid signal from the electronic control unit 5. The solenoid valve 36 drains the fluid pressure from a solenoid signal pressure fluid passage 307 connecting to the line fluid passage 301 through an orifice and stops draining the pressure. Thus, the C-1 changeover valve 35 and the solenoid valve 36 perform the function of the changeover means able to be selectively changed over between the first position (indicated in the lower half of the illustration for valve 35 and the top portion for solenoid 36; in the drawing) for supplying the line pressure ($P_L$), or ($P_D$) as shown in FIG. 4, to the hydraulic servo C-1 of the clutch C1 through the fluid passage 304 and the second position (indicated in the upper half of the illustration of each of the valves in the drawing) for supplying the regulated fluid pressure ($P_A$) thereto based on the signal from the electronic control unit 5.

Figure 5:
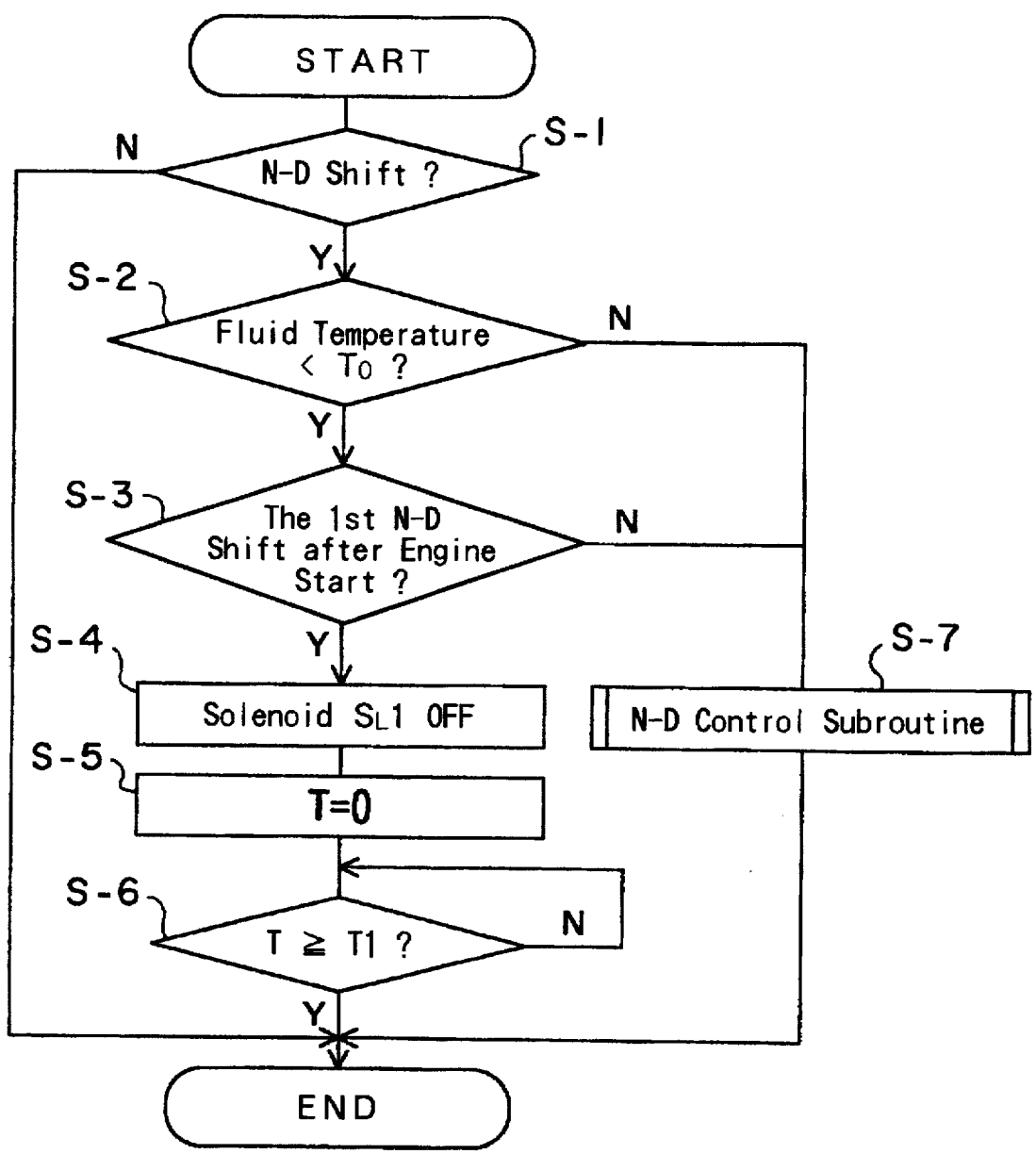
FIG. 5 is a flowchart illustrating the operation of the control apparatus according to the embodiment.

The thus structured hydraulic circuit as shown in FIG. 4 is controlled by the electronic control unit 5. Referring to the flowchart of FIG. 5, the first step S-1 determines whether the N-to-D shift has been performed on the basis of the signal from the neutral start switch sensor Sn5. Then, step S-2 provided as the second determining means according to the invention determines whether the fluid temperature exceeds a predetermined temperature ($T_0$) on the basis of the signal from the fluid temperature sensor Sn6 (the criterion temperature T0 used for determination regarding low temperature is preset to, for example, −10° C.). Step S-3 corresponding to the first determining means according to the invention determines whether the N-to-D shift has been performed for the first time since start of the engine (E/G), on the basis of a combination of the signal from the engine speed sensor Sn2 and the signal from the neutral start switch Sn5. The affirmative determination in step S-3 is followed by step S-4 provided as the fluid pressure raising means, where the solenoid signal $S_L1$ to magnetize the solenoid valve 36 is turned off. The solenoid valve 36 is thus turned off to allow for drainage through the fluid passage 307 so that the changeover valve 35 is switched to the line pressure supplying state indicated by the lower half of its illustration in FIG. 4. Thereby, the line pressure ($P_L$) of the D range pressure fluid passage 302, that is, the required engaging pressure, starts to be supplied to the hydraulic servo C-1 via the C-1 changeover valve 35 and the fluid passage 304. Then, step S-5 resets a timer T that is referred to for maintaining this pressure supply state. After the reset, step S-6 measures the time by the timer T. When the timer valve T exceeds a predetermined valve T1, the clutch has approximately completed engagement, so that the control operation is ended. On the other hand, if step S-2 or step S-3 makes a negative determination, the operation proceeds to step S-7 to perform the N-to-D control subroutine.

Figure 6:
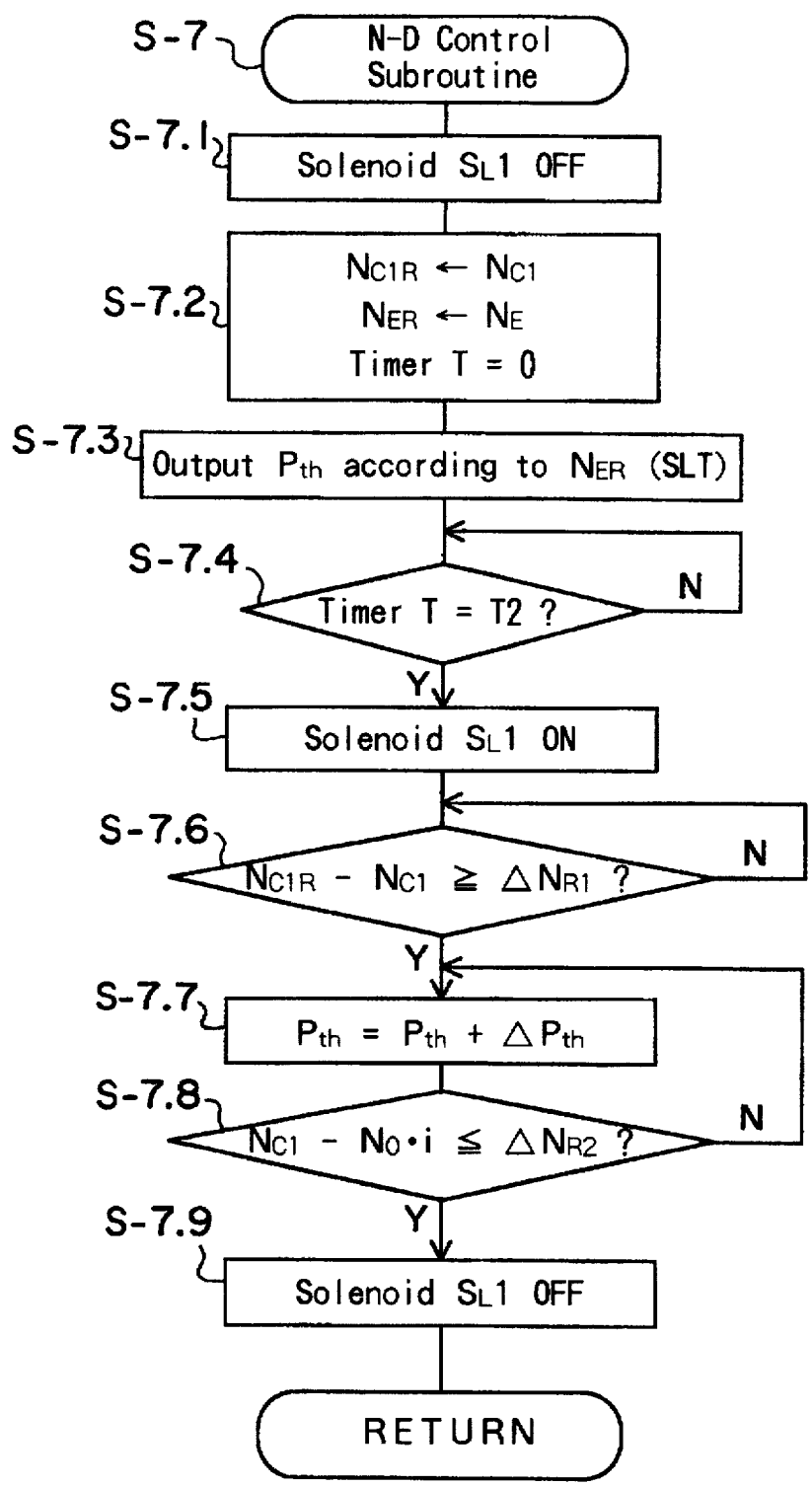
FIG. 6 shows a flowchart illustrating the N-to-D control subroutine in the flowchart of FIG. 5.

In the N-to-D control subroutine is illustrated in FIG. 6. The fluid pressure raising means according to the invention is provided in the form of a program installed in the electronic control unit, performs the operation provided for the case where at least one of the first and second determining means makes negative determination. Referring to the drawing, step S-7.1 turns off the magnetizing signal $S_L1$ to the solenoid valve 36. The fluid pressure of the fluid passage 307 is thus drained, so that the C-1 changeover valve 35 is switched to the line pressure supplying state. The following step S-7.2 sets the current rotational speed ($N_{C1}$) of the clutch C1 as the clutch rotational speed ($N_{C1R}$) at the time of the N-to-D shift, and the current engine speed ($N_E$) as the engine speed ($N_{ER}$) at the time of the N-to-D shift, and also resets a timer T. In step S-7.3, the C-1 control valve 33 is supplied with the signal pressure ($P_{th}$) from the linear solenoid valve 34 in accordance with the engine speed ($N_{ER}$), and the C-1 control valve 33 outputs a regulated fluid pressure ($P_A$) in accordance with the signal pressure ($P_{th}$). Step S-7.4 determines whether value of the timer T has become T2. According to this embodiment, the timer value T2 is preset to a time point slightly preceding the time point to start engaging the clutch C1. The reason for this setting is that even if detection delay or the like should occur, this setting will prevent an incident where supply of the line pressure ($P_L$) continues beyond the clutch engagement starting timing. The steps described above perform the control for causing the hydraulic servo C-1 to rapidly operate its piston until the engagement is achieved.

If step S-7.4 determines that the value of the timer T has become equal to T2 after repeating time measurement of the timer T, step S 7.5 turns on the magnetizing signal $S_L1$ to the solenoid valve 36. The C-1 changeover valve 35 is thereby switched (top half in FIG. 4) to supply the hydraulic servo C-1 with a regulated fluid pressure ($P_A$) from the C-1 control valve 33 previously caused to commence the output regulated stable fluid pressure ($P_A$) in step S-7.3. Then, step S-7.6 determines that the engagement has started, when the current rotational speed ($N_{C1}$) of the clutch C1 has become less than the rotational speed ($N_{C1R}$) of the clutch C1 at the time of the N-to-D shift, by at least a predetermined value ($\Delta N_{R1}$).

Based on the determination at step S-7.6, the following step S-7.7 increases the fluid pressure supply ($P_{C-1}$) to the hydraulic servo C-1 by a predetermined amount ($\Delta P_{th}$) in a cycle of a predetermined length of time. The predetermined amount ($\Delta P_{th}$) is preset in accordance with the input torque. More specifically, the predetermined amount ($\Delta P_{th}$) increases with increases of the input torque. The input torque is detected on the basis of the throttle opening ($\theta$) according to this embodiment. Then, step S-7.8 determines that the control is to be ended, when the clutch C1 has substantially completed engagement, more specifically, when the difference between the current input rotational speed ($N_{C1}$) of the clutch C1 and the output rotational speed (No·i) (that is, the rotational speed obtained by multiplying the first speed gear ratio i with the output rotational speed (No) detected by the vehicle speed sensor Sn4) of the clutch C1 has become a predetermined value ($\Delta N_{R2}$) or less. Based on the determination in step S-7.8, the last step S 7.9 turns off the signal $S_L1$ to the solenoid valve 36. The C-1 changeover valve 35 is thereby switched back to the state for directly supplying the line pressure ($P_L$) as the required engaging pressure.

The control according to the subroutine described above is effective to achieve expected control characteristics during normal driving, but cannot achieve precise response of the servo fluid pressure to the control characteristics for the N-to-D shift performed when the fluid temperature is low and the engine has just been started, for the reason stated above. For such cases, the control according to the main routine is performed.

Figure 7:
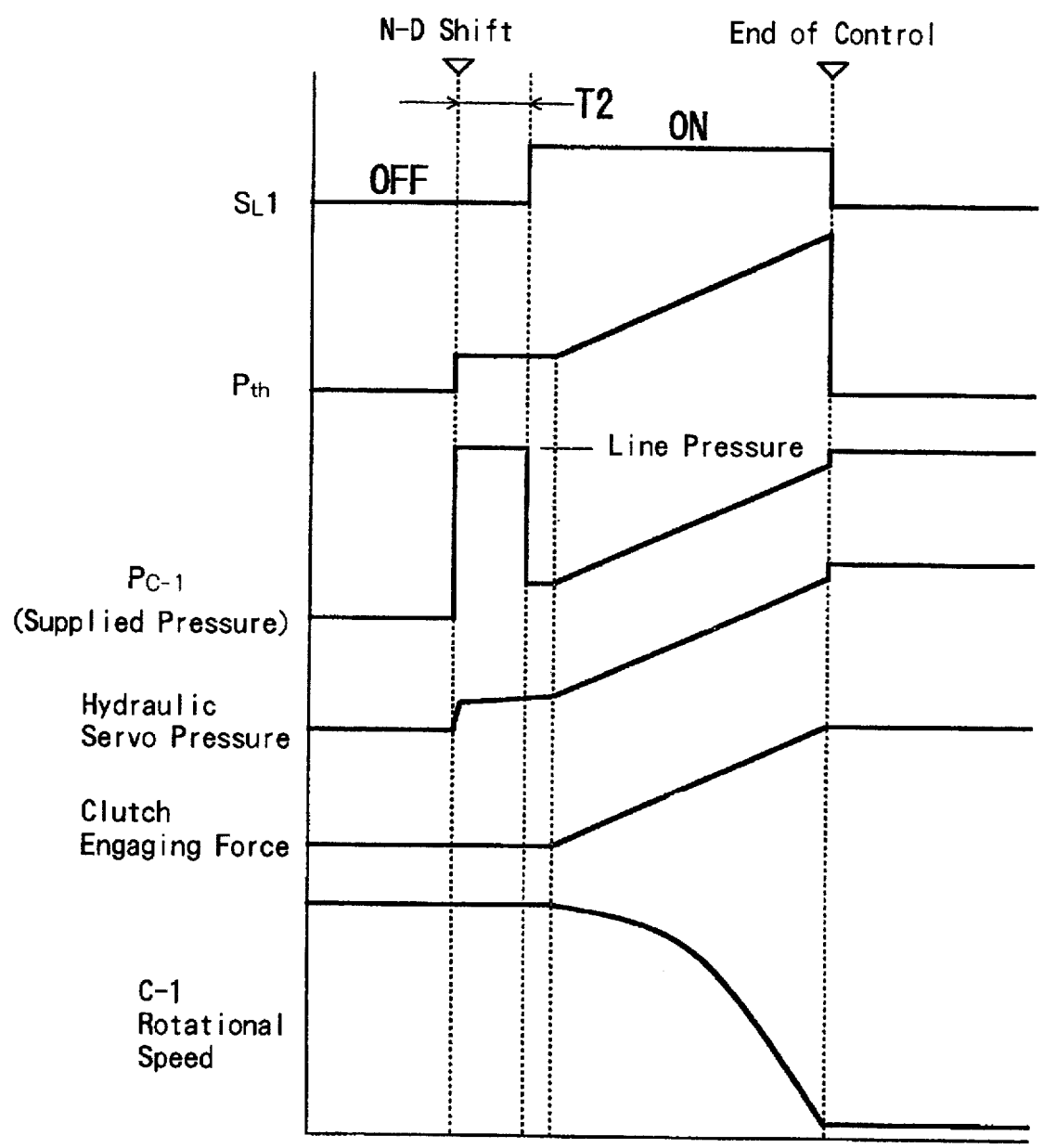
FIG. 7 is a timing chart indicating the control characteristics achieved by the subroutine shown in FIG. 6.
Figure 8:
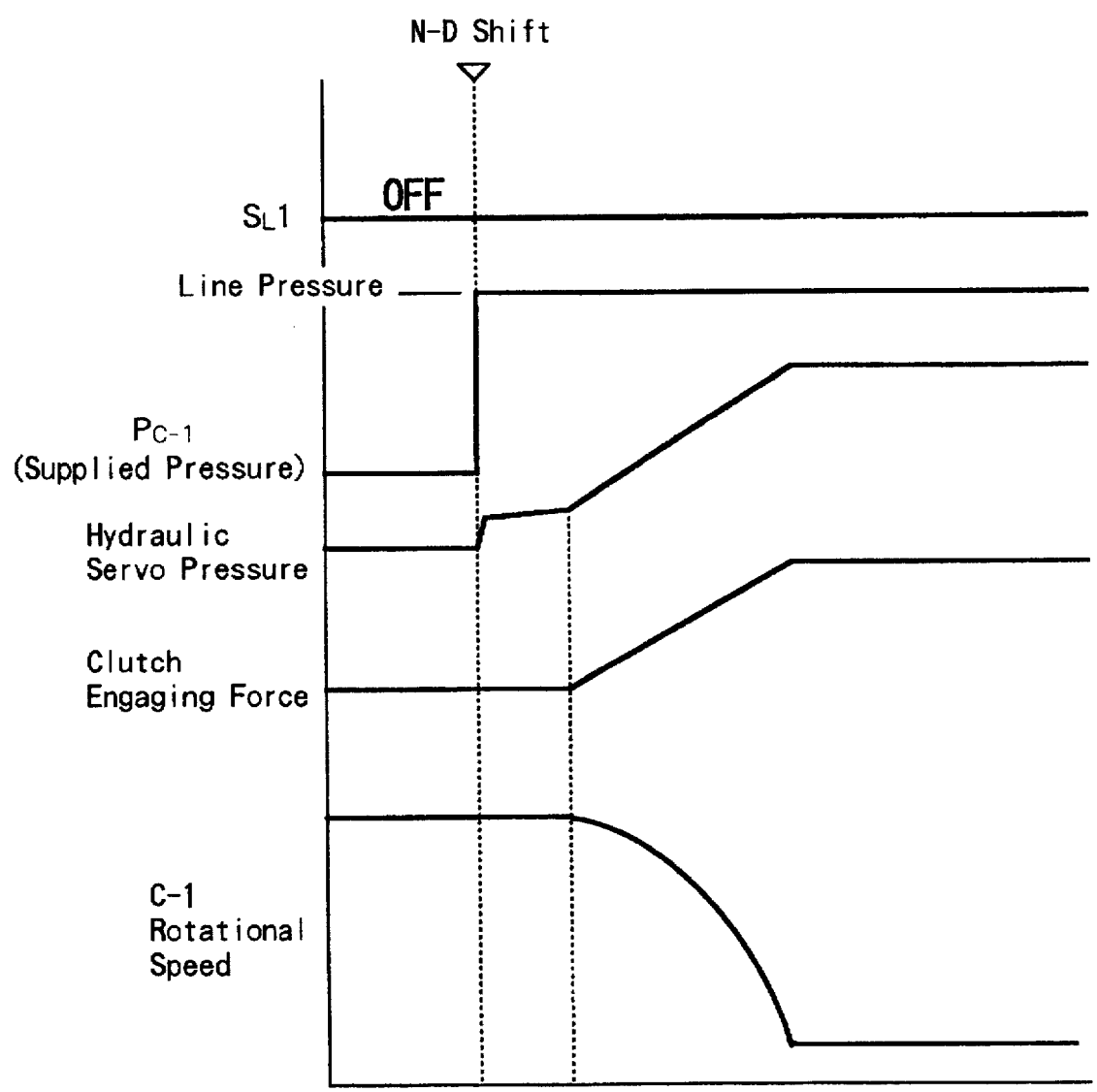
FIG. 8 is a timing chart indicating the control characteristics achieved by the main routine shown in FIG. 5.
Figure 9:
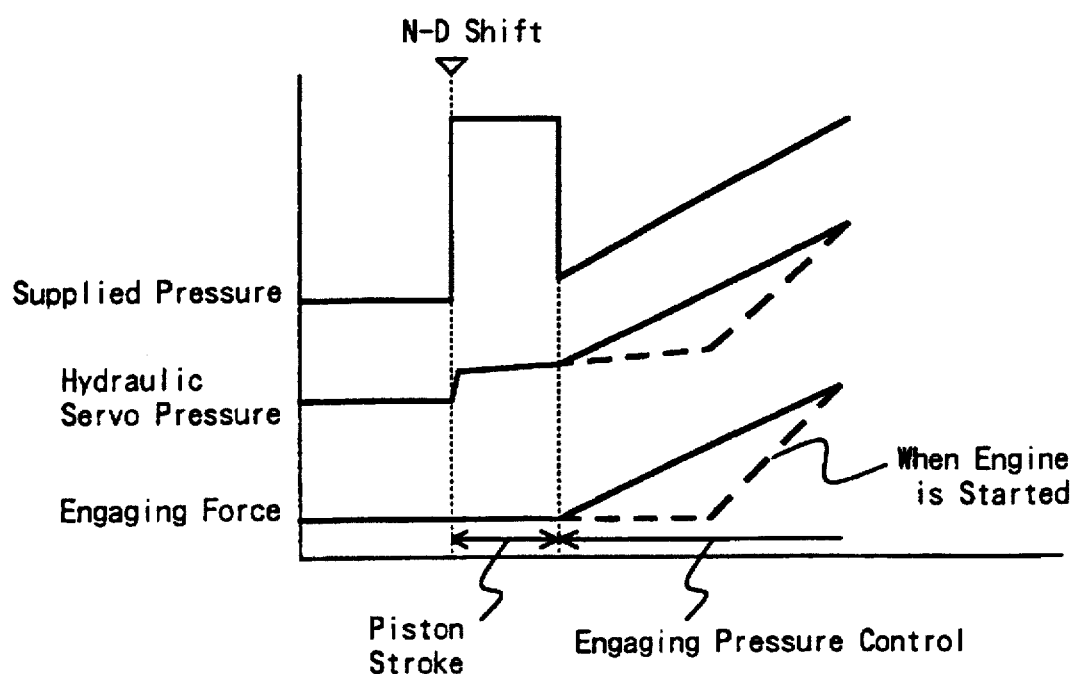
FIG. 9 is a timing chart indicating the control characteristics achieved by a conventional automatic transmission control apparatus.

FIGS. 7 and 8 show timing charts according to the flowcharts described above. FIG. 7 shows the timing chart of the normal operation where control is performed according to the subroutine. During the timer measurement time T2 following the start of the N-to-D shift, the pressure supply ($P_{C-1}$) to the hydraulic servo C-1 becomes a shelf pressure caused by the direct supply of the line pressure ($P_L$). The supply of the shelf pressure is intended to supply a sufficient amount of fluid rather than to provide a pressure increase, in order to cause rapid piston stroke. Consequently, the actual fluid pressure inside the hydraulic servo C-1 does not increase to the level of the line pressure ($P_L$) because of the volume changes caused by the piston stroke, but exhibits the changing characteristics as indicated by the line of "HYDRAULIC SERVO PRESSURE".

In contrast, FIG. 8 indicates the engaging characteristic of the clutch C1 when control is performed according to the main routine, that is, when the temperature is low and the clutch C1 is engaged for the first time after the start of the engine. The pressure supply ($P_{C-1}$) to the hydraulic servo C-1 becomes equal to the line pressure ($P_L$) simultaneously with the N-to-D shift. As in the control for normal operation, the fluid pressure inside the hydraulic servo C-1 becomes a pressure that will remain approximately constant as indicated in FIG. 8. Subsequently, when the clutch C1 starts to engage, the fluid pressure in the hydraulic servo C-1 gradually rises in accordance with the flow resistance of the operating fluid. This rise of the fluid pressure is substantially the same as the fluid pressure rise under control. Thus, the control according to this embodiment performs clutch engagement without causing time lag even when the fluid temperature is low and the clutch C1 is engaged for the first time after the start of the engine.

To summarize, the embodiment supplies fluid pressure in the non-control mode in accordance with the flow resistance of the operating fluid when the fluid temperature is low and the N-to-D shift is performed for the first time after the start of the engine. The embodiment avoids clutch engaging shocks and eliminates time lag in the engagement of the clutch C1 by utilizing the fluid pressure rise in the hydraulic servo characteristic to low fluid temperature instead of performing the pressure raising control which is unlikely to achieve precise response in such a low-temperature situation.

While the invention has been described with reference to what is presently considered to be a preferred embodiment thereof, it is to be understood that the invention is not limited to the disclosed embodiments. To the contrary, the invention is intended to cover various modifications and equivalent arrangements included within the spirit and scope of the appended claims.

What is claimed is:

1. An automatic transmission control apparatus, comprising:

a clutch which, when a forward driving range is selected, is engaged to transmit rotation from an engine to a speed changing apparatus;

a hydraulic servo for selectively engaging and releasing said clutch;

fluid temperature detecting means for detecting fluid temperature;

engine start detecting means for detecting start of said engine;

range shift detecting means for detecting shift to said forward driving range; and control means for controlling fluid pressure supply to said hydraulic servo on the basis of a signal from said fluid temperature detecting means, a signal from said range shift detecting means, and a signal from said engine start detecting means, said control means comprising:

first determining means for, when shift to said forward driving range is performed, determining whether the shift to said forward driving range has been performed for the first time since a start of said engine;

second determining means for determining whether a detected fluid temperature is lower than a predetermined fluid temperature on the basis of the signal from said fluid temperature detecting means; and fluid pressure raising means for rapidly raising the fluid pressure supply to said hydraulic servo up to a required engaging pressure for said clutch when said first determining means determines that the shift to the forward driving range has been performed for the first time since the start of said engine and said second determining means determines that the detected fluid temperature is lower than said predetermined fluid temperature, said fluid pressure raising means rapidly provides a first fluid pressure supply for a predetermined time, changing the first fluid pressure supply over to a second fluid pressure supply and gradually raising the second fluid pressure supply to said hydraulic servo up to said required engaging pressure for said clutch on the basis of a predetermined rising characteristic when at least one of said first determining means and said second determining means makes a negative determination.

2. An automatic transmission control apparatus according to claim 1, wherein said control means further comprises fluid pressure control means and electronic control means, and wherein said fluid pressure control means comprises:

a manual valve for outputting a forward driving range pressure when said forward driving range is selected;

pressure regulating means for regulating said forward driving range pressure on the basis of a signal from said electronic control means to output a regulated fluid pressure; and changeover means able to be selectively changed over between a first position for supplying said forward driving range pressure to said hydraulic servo, and a second position for supplying said regulated fluid pressure to said hydraulic servo, on the basis of a signal from said electronic control means, and wherein said electronic control means comprises said first determining means, said second determining means and said fluid pressure raising means, and wherein when said first determining means determines that the shift to the driving range means has been performed for the first time since the start of the engine and said second determining means determines that the detected fluid temperature is lower than the predetermined fluid temperature, said fluid pressure raising means outputs a signal to said changeover means to hold said changeover means in said first position at least for a period lasting until the engagement of said clutch is completed to provide the first fluid pressure supply to said hydraulic servo, and wherein at least one of said first determining means and said second determining means makes the negative determination, said fluid pressure raising means, in order to provide the second fluid pressure supply to said hydraulic servo, outputs a signal to said changeover means to shift said changeover means to said second position, and outputs a signal to said pressure regulating means to cause said pressure regulating means to gradually raise the fluid pressure from an initial fluid pressure.

* * * * *